Patented July 24, 1934

1,967,265

UNITED STATES PATENT OFFICE 1,967,265

PROCESS OF REDUCING SULPHUR DIOXIDE

Ludwig Rosenstein, San Francisco, Calif., and Leonard Klein, Clarkdale, Ariz., assignors to United Verde Copper Company, a corporation of Delaware No Drawing. Application July 22, 1931,
Serial No. 552,540

12 Claims. (Cl. 23—226)

This invention relates to sulphur recovery and has for an object the provision of an improved process for recovering elemental sulphur from gases containing sulphur compounds. More particularly, the invention contemplates the provision of an improved process for recovering sulphur from gases containing sulphur dioxide.

Furnace gases obtained from the smelting or roasting of sulphide ores contain most of the sulphur of the ores combined with oxygen in the form of sulphur dioxide. Such gases may contain, roughly, about 8% sulphur and 4% oxygen, the balance comprising, for the most part, inert gases such as nitrogen. The gases are usually allowed to pass from the smelting or roasting apparatus into the atmosphere with the result that the sulphur of the ore, one of its chief constituents, is lost. The sulphur dioxide which passes into the atmosphere may also cause damage to vegetation in the vicinity of the smelting or roasting plant.

It has long been considered to be desirable to prevent the loss of sulphur and eliminate the nuisance effect of sulphur dioxide-containing gases by so treating the gases as to recover therefrom a marketable sulphur product. To this end, many processes of different types have been proposed for treating the gases to produce therefrom elemental sulphur or a marketable sulphur compound. Thus, it has been proposed to utilize the sulphur dioxide of the sulphur gases for the production of sulphuric acid. Several successful sulphuric acid processes have been developed, but the market for sulphuric acid produced from furnace gases is limited, and only a very small proportion of the total available sulphur dioxide may be utilized in this manner.

It has also been proposed to reduce the sulphur dioxide by subjecting it at elevated temperatures to the action of carbonaceous or hydrocarbon reducing agents to produce elemental sulphur and/or hydrogen sulphide.

One type of proposed reducing operation involves the passing of the sulphur dioxide through or in contact with an incandescent bed of solid carbonaceous material confined in a suitable reaction chamber provided with means for permitting the ingress and egress of gases. Such processes have not been highly successful commercially because of the difficulties involved in maintaining proper conditions for the reaction and in recovering the elemental sulphur produced in a marketable form.

When the gases are passed through or in contact with the bed of incandescent solid carbonaceous material, the sulphur dioxide is reduced and elemental sulphur is formed. At the same time, the free and combined oxygen contained in the gases combines with the carbon to form carbon monoxide and/or carbon dioxide. The elemental sulphur is produced in vapor form and issues from the reaction chamber with the carbon monoxide, carbon dioxide, and any inert gases which may have been associated with the sulphur dioxide. Even when a relatively pure sulphur dioxide produced is employed, inert gases and free oxygen may be present during the course of the reaction, as it is frequently necessary to employ at least a small amount of air or other oxygen-containing gas in conjunction with the sulphur dioxide in order to maintain a suitable reaction temperature. The gases issuing from the reaction chamber may also contain small particles of solid carbonaceous material. In order to recover the elemental sulphur, it is necessary to condense the sulphur vapor by cooling the gases issuing from a reaction chamber to a temperature below the boiling point of sulphur.

Another type of proposed reducing operation involves the use of substances such as calcium sulphide for promoting reactions between sulphur dioxide and hydrocarbons to produce elemental sulphur and/or hydrogen sulphide. In carrying out such operations the sulphur dioxide-containing gases are mixed with amounts of hydrocarbons at least sufficient to reduce the sulphur dioxide to the desired extent, and the mixture is subjected at an elevated temperature to the action of the contact agent confined in a suitable reaction chamber. The hydrocarbons function to reduce the sulphur dioxide, the reaction products comprising elemental sulphur and/or hydrogen sulphide, one or more oxides of carbon and water vapor, all of which are gaseous at the temperature of the reaction. As in the case of processes involving the reduction of sulphur dioxide by means of incandescent solid carbonaceous material, the reaction products will be diluted with other gaseous substances such as the inert gases associated with the sulphur dioxide and one or more oxides of carbon and water vapor resulting from reaction of the hydrocarbons with free oxygen which may have been associated with the sulphur dioxide or which may have been provided for aiding in maintaining a suitable reaction temperature. When elemental sulphur is produced, it is separated by cooling the gases to condense the sulphur vapors. When hydrogen sulphide is produced, the gases must be further treated in order that the sulphur of the hydrogen sulphide may be oxidized to produce elemental sulphur.

It is exceedingly difficult, and, in some instances, commercially impracticable, at the present time, to utilize the heretofore proposed processes involving the reduction of sulphur dioxide to produce elemental sulphur.

When elemental sulphur is produced directly from the reduction of sulphur dioxide by means of hydrocarbons or incandescent solid carbonaceous material, the elemental sulphur produced is obtained in the form of vapor diluted with gaseous products of the reactions and inert gases which may have been associated with the sulphur dioxide employed and/or with oxygen used for combustion of some of the hydrocarbons or solid carbonaceous material to provide additional heat. The problem of recovering the elemental sulphur is complicated by the presence of large volumes of diluent gases or gaseous reaction products. It is extremely difficult and expensive to provide suitable apparatus and so control its operation as to effect an efficient separation of elemental sulphur from a mixture of gases comprising sulphur vapor and large volumes of diluent gases.

In the case of processes involving the reduction of sulphur dioxide by means of carbonaceous reducing agents, the problem of recovering elemental sulphur in marketable form may be further complicated by the presence of solid carbonaceous material in the solid or liquid sulphur product which is separated from the gaseous mixture of sulphur vapor and diluent gases. The presence of such material will necessitate a further refining operation.

Processes involving the reduction of sulphur dioxide by means of hydrocarbons may be so controlled as to convert the major portion of the sulphur dioxide to elemental sulphur or to convert substantially all of the sulphur dioxide to hydrogen sulphide. When an effort is made to so control the operation as to convert the major portion of the sulphur dioxide to elemental sulphur, it is found that the reactions involved do not proceed smoothly or to completion and that appreciable amounts of hydrogen sulphide and carbonyl sulphide (COS) are produced. The presence of such compounds further complicates the recovery of the elemental sulphur produced because of their corrosive and toxic properties.

The reduction of sulphur dioxide to hydrogen sulphide by means of hydrocarbons may be carried out efficiently, but the hydrogen sulphide gas is difficult to handle because of its corrosive and toxic properties. In order that elemental sulphur may be produced, the hydrogen sulphide must be oxidized with the result that the elemental sulphur may be produced in the form of vapor mixed with large amounts of diluent gases. The hydrogen sulphide gas, as produced, may be associated with large volumes of diluent gases, and the proportion of diluent gases may be further increased as a result of the oxidizing operation.

The present invention contemplates the provision of an improved process for reducing sulphur dioxide to produce elemental sulphur directly in such a state that it may be recovered readily and without producing poisonous and corrosive gases which are produced in carrying out some of the heretofore proposed processes.

The process of the present invention involves the reduction of sulphur dioxide by means of a reducing agent capable of combining with the oxygen of the sulphur dioxide to form a substance which is non-volatile at the temperature of the reaction and from which the added oxygen may be readily removed to regenerate the original reducing agent. A complete process of the invention may be considered to include two reducing stages, in one of which sulphur dioxide is reduced, and in the other of which an oxidized product resulting from the reduction of sulphur dioxide is reduced. A complete process of the invention may also be considered to include alternate oxidizing and reducing stages, the reducing agent being alternately oxidized and regenerated by reduction of the oxidized product.

The invention is based primarily on our discovery that metal sulphides such as calcium sulphide and sodium sulphide react with great avidity with sulphur dioxide at elevated temperatures to produce the corresponding sulphate and elemental sulphur in accordance with the following equations:

(1) $CaS + 2SO_2 = CaSO_4 + S_2(g)$
(2) $Na_2S + 2SO_2 = Na_2SO_4 + S_2(g)$ 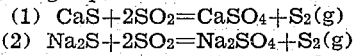

The process of the invention involves the reduction of sulphur dioxide by means of a suitable reducing agent at a temperature above the boiling point of sulphur. The elemental sulphur is produced in gaseous form, and sulphur gas issues from the reaction vessel continuously as the reducing operation proceeds. By so regulating the operation as to maintain a temperature above the boiling point of sulphur, the heat developed by the reaction is utilized for aiding in separating the elemental sulphur produced and the non-volatile product resulting from oxidation of the reducing agent. The necessity for employing an additional distillation or solution step for the recovery of the sulphur is thus eliminated, and, in addition, a non-volatile oxidized product which may be subjected directly to a reducing operation is produced.

For the purpose of carrying out the process of the invention, any substance which reacts with sulphur dioxide to produce elemental sulphur and a non-volatile oxidation product from which the original substance may be obtained by reduction may be used as a reducing agent for the sulphur dioxide. Substances which may be used advantageously include alkali and alkaline earth metal sulphides and aluminum compounds such as reduction products of potassium alum and alunite. We prefer to employ calcium sulphide or magnesium sulphide or a mixture comprising calcium sulphide and magnesium sulphide.

In carrying out the process of the invention, the sulphur dioxide-containing gases are passed in intimate contact with the reducing agent confined in a suitable reducing or reaction chamber. The construction of the reaction chamber and the arrangement of the reducing agent within the reaction chamber are preferably such that sulphur dioxide-containing gases may be introduced into the reaction chamber and passed therethrough along a tortuous path in intimate contact with the reducing agent. A passage to permit the egress of gases should be provided at the end of the path of travel within the reaction chamber. The temperature which promotes the reaction most advantageously is preferably maintained in the reaction chamber.

At the most suitable reaction temperatures, certain reducing agents such, for example, as calcium sulphide will be solid, while other reducing agents such, for example, as sodium sulphide will be liquid. Alkali metal sulphides form eutectics of quite low melting points with alkali metal sulphates. Therefore, when an alkali metal sulphide such as sodium sulphide is employed, a molten bath consisting of sodium sulphide and sodium sulphate will be formed.

When employing an alkali metal sulphide, we prefer to conduct the operation by first bubbling the sulphur dioxide-bearing gases through the liquid bath to reduce the sulphur dioxide and then bubbling a reducing gas such as carbon monoxide or natural gas through the liquid bath to regenerate the sulphide.

When a reducing agent which is solid at the temperature of the reaction is employed, its physical condition should be such as to offer a large surface for action without introducing undue resistance to the flow of gases. In the case of calcium sulphide, we have found it to be desirable to reduce the material to about ¼ inch although we have operated successfully with material both much finer and much coarser. We have also found it desirable to start with calcium sulphate in the form of its hydrate ($CaSO_4.2H_2O$) which, on heating, gives up its water of crystallization, but retains its form and therefore produces a very porous and active mass.

Sulphur dioxide-containing gases in which the sulphur dioxide is present in the proportions in which it is usually present in furnace gases or relatively pure sulphur dioxide gas may be employed. Inert gases associated with the sulphur dioxide function to sweep out from the reaction vessel gaseous sulphur produced during the course of the reaction. The sulphur vapor or the gases containing the sulphur vapor are cooled to condense the sulphur which is recovered and cast in suitable forms for marketing.

The reducing operation is permitted to proceed until the reducing agent is completely oxidized or as long as the operation is efficient. The oxidized agent is then subjected at a suitable temperature to the action of a reducing agent in the absence of sulphur and sulphur dioxide for the purpose of regenerating the original reducing agent. The reduction of the oxidized product is continued until a product corresponding substantially to the original reducing agent is obtained.

The cycle of operations involving the alternate reduction of the sulphur dioxide and the oxidized product resulting from reduction of the sulphur dioxide is preferably repeated continuously. In order that elemental sulphur may be produced continuously, two or more reaction chambers are preferably provided, thus permitting reduction of sulphur dioxide in at least one reaction chamber while reduction of the oxidized product is being carried out in one or more other reaction chambers.

Sulphur dioxide reducing agents for use in the process of the invention may be prepared initially in any suitable manner. We have obtained suitable metal sulphide reducing agents by reducing the corresponding sulphates with hydrocarbons. Thus, for example, in preparing a reducing agent containing calcium sulphide, we first dehydrate gypsum ($CaSO_4.2H_2O$) by heating the gypsum in the form of lumps on cylinders of suitable sizes and in a suitably enclosed vessel to a temperature of about 300° C. while passing a gas in contact with the mass of material. The heating under such conditions is continued until the gases issuing from the vessel are substantially free from water vapor. The dehydrated product is then subjected to the action of natural gas in a suitable reaction chamber at a temperature of about 900° C. for a sufficiently long period to effect substantially complete reduction of the calcium sulphate to calcium sulphide. The end of this reaction may be determined by the rapid dropping off of the carbon dioxide content of the gases issuing from the reaction chamber. The reaction tends to become slower as the reduction of calcium sulphate proceeds, and it is not generally economical or necessary to carry it to completion.

The preparation of the sulphur dioxide reducing agents initially may be conducted in the reaction chambers in which the reduction of sulphur dioxide is carried out. Regeneration of the reducing agents is preferably carried out in the reaction chambers in which the reduction of sulphur dioxide is carried out in order to avoid the necessity for handling the materials frequently. For this reason, in regenerating the reducing agents it is desirable to employ a gaseous reducing agent such as natural gas which may be handled with the same facility and in the same manner as gaseous sulphur dioxide and which will readily penetrate the mass of material and come into intimate contact with the particles or surfaces thereof.

In carrying out a process in accordance with our invention, a reducing agent such, for example, as one containing calcium sulphide is prepared by first dehydrating gypsum ($CaSO_4.2H_2O$) and then subjecting the dehydrated product to the action of a hydrocarbon gas such as natural gas at a temperature of about 900° C. for a sufficient length of time to effect substantially complete reduction of the sulphate to the sulphide. The gypsum is preferably cast in the form of lumps or small cylinders prior to subjecting it to the dehydrating operation. The calcium sulphate reducing operation is preferably conducted in the reaction chamber which is to be employed for the operation involving the reduction of sulphur dioxide and which is provided with a passage for the introduction of reagent gases and a passage for the removal of gaseous reaction products. Care should be exercised to maintain the sulphide material in such a condition in the reaction chamber that sulphur dioxide-containing gases entering the reaction chamber will come into intimate contact therewith.

While the sulphide product is still hot from the reducing operation, sulphur dioxide-containing gas is passed into the reaction chamber in contact therewith. The sulphur dioxide employed may be obtained from any suitable source. Furnace gases containing sulphur dioxide may be employed directly, or the sulphur dioxide contained therein may be extracted to provide substantially pure sulphur dioxide gas, or the sulphur dioxide may be transferred from the furnace gases to another body of gases in which it will be present in greater concentration than in the furnace gases. In carrying out the process of reducing the sulphur dioxide, it is advisable to maintain a temperature in excess of about 700° C. within the reaction chamber. We have operated the process successfully at temperatures ranging from 750° C. to 1000° C., but we prefer to operate in the region from 850° C. to 950° C.

The reaction between the sulphur dioxide and the calcium sulphide is exothermic and when relatively pure sulphur dioxide gas is employed it will proceed rapidly to substantial completion once it has been initiated. When gases containing sulphur dioxide in relatively small amounts are employed the heat of the reaction is dissipated by the diluent gases and it may be necessary to employ additional heating means.

In order to aid in maintaining the desired temperature, the gases entering the reaction chamber may be passed in heat exchanging relationship with the hot gaseous product of the reducing operation. If the heat exchanging operation is reasonably efficient, the heat contained in the entering gases together with the heat developed by the reaction will be sufficient to maintain the desired temperature within the reaction chamber. If additional heat is required, it may be supplied in any suitable manner, as, for example, by heating the reaction chamber by means of an externally applied combustion flame or electrical source of heat, or by providing means in addition to the exit gases for heating the entering gases.

When furnace gases are employed as a direct source of sulphur dioxide, they should be subjected to a cleaning operation for the purpose of removing dust and undesirable compounds such, for example, as arsenic compounds and selenium compounds before being admitted to the reaction chamber.

The sulphur dioxide in passing through the reaction chamber comes into contact with the calcium sulphide and it is reduced thereby to elemental sulphur. The atmosphere within the reaction chamber is oxidizing with respect to the calcium sulphide, and, as the sulphur dioxide is reduced by the calcium sulphide, the calcium sulphide is oxidized by the sulphur dioxide and any free oxygen which may be present to calcium sulphate. The elemental sulphur is produced in gaseous form and passes out of the reaction chamber substantially immediately, thereby preventing reversal of the reaction. The reducing operation may be so controlled that all of the sulphur dioxide admitted to the reaction chamber is reduced until the calcium sulphate is substantially completely oxidized, and the exit gases will be substantially free from sulphur dioxide.

The activity of the mass of calcium sulphide reducing agent will be gradually impaired, and it is, therefore, desirable to proportionately reduce the rate at which sulphur dioxide is admitted to a reaction chamber containing a mass of reducing agent from the commencement of the operation until the time at which the mass becomes inefficient.

Sulphur dioxide is admitted to the reaction chamber until the mass of reducing agent becomes inefficient. When any appreciable proportion of the sulphur dioxide introduced into the reaction chamber appears in the issuing gases the introduction of sulphur dioxide should be discontinued. At such time, and while the oxidized mass is still hot, the introduction of a gaseous hydrocarbon such as natural gas should be commenced. The reduction of the oxidized mass by means of the hydrocarbon should be continued under suitable temperature conditions until the mass is restored substantially to its original condition.

While the oxidized mass is being reduced, reduction of sulphur dioxide may be carried on in a separate similar reaction chamber in the presence of an active mass of calcium sulphide. It is desirable to provide and operate a large number of similar reaction chambers in order to produce elemental sulphur continuously and at a uniform rate and to utilize sulphur dioxide-containing gases as they are produced. The most satisfactory complete operation will include a large number of processes involving the reduction of sulphur dioxide and a large number of processes involving the reduction of oxidized products in various stages of completion.

When substantially pure sulphur dioxide gas is employed, the gases issuing from the reaction chamber will consist of substantially pure sulphur vapor. When furnace gases containing relatively small amounts of sulphur dioxide are employed, the gases issuing from the reaction chamber will consist essentially of sulphur vapor and inert gases such as nitrogen. Any oxygen contained in the furnace gases will react with the calcium sulphide to form calcium sulphate which is not volatile at the temperature of the reaction.

The gases containing sulphur vapor may be cooled in any suitable manner to condense the sulphur vapor. The condensed sulphur is recovered in suitable forms for marketing.

The gases resulting from the operation involving the reduction of the oxidized product may be utilized for any suitable purpose or wasted, as desired.

The present invention provides a process by means of which sulphur may be recovered from gases containing sulphur dioxide efficiently and relatively cheaply. Readily available materials may be used as reducing agents and such materials may be revivified or regenerated without difficulty. Regeneration of the reducing agents may be accomplished without handling. No toxic or poisonous gases are produced in any stage of the process. Proper control of the process will result in substantially complete recovery of all of the sulphur of sulphur dioxide-containing gases in the form of elemental sulphur without the production of intermediate sulphur compounds which might be difficult to handle or treat. The elemental sulphur product obtained directly from the reduction of the sulphur dioxide is in the form of substantially pure sulphur vapor or in the form of sulphur vapor associated with relatively small amounts of diluent gases owing to the fact that the combined oxygen of the sulphur dioxide and any free oxygen associated with the sulphur dioxide combine with the reducing agents to form non-volatile products. The final product of the process is pure elemental sulphur free from contaminating and discoloring substances such as carbon. The elimination of reaction products other than elemental sulphur from the gases issuing from the reaction chamber simplifies the problem of recovering the elemental sulphur. Other conditions being the same, the separation of elemental sulphur from small volumes of diluent gases is much simpler than the separation from large volumes. Furthermore, the size or number of pieces of apparatus required to effect a separa-

We claim:

1. A method of recovering sulphur from sulphur dioxide-containing gases comprising the steps of reducing the sulphur dioxide by solid calcium sulphide maintained above 700° C. by the heat of the reaction and by the sensible heat content of the sulphur dioxide-bearing gases; then reducing the calcium sulphate formed in situ by the action of a gaseous reducing agent above 700° C. and maintaining this temperature by the heat of the reaction and the sensible heat content of the entrant reducing gases; and repeating this cycle of operations; condensing and collecting the sulphur produced during the reduction of the sulphur dioxide.

2. In a process for reducing sulphur dioxide to sulphur involving the use of an agent oxidizable by sulphur dioxide to a substance which is non-volatile at the temperature of the reaction, the improvement which comprises subjecting the agent to the action of sulphur dioxide to produce elemental sulphur and an oxidized non-volatile reaction product, collecting the elemental sulphur produced, and separately treating the oxidized product to regenerate the oxidizable product for use in the reduction of additional sulphur dioxide.

3. The method of recovering sulphur which comprises alternately passing sulphur dioxide in contact with a substance oxidizable by sulphur dioxide to a substance which is non-volatile at the temparature of the reaction and a reducing agent in contact with the resulting oxidized product, thereby producing elemental sulphur and regenerating the oxidizable substance in separate successive stages of the operation.

4. The method of recovering sulfur which comprises treating, with sulfur dioxide, a reducing agent capable of combining with the oxygen of the sulfur dioxide to form a substance which is non-volatile at the temperature of the reaction and from which the oxygen is capable of being removed by reduction to regenerate the reducing agent, maintaining the temperature of the reaction above the boiling temperature of sulfur, whereby the sulfur formed by the reduction of the sulfur dioxide is in the gaseous form, continuing the treatment of the reducing agent with sulfur dioxide until a substantial portion of the reducing agent has been oxidized, then discontinuing the treatment with sulfur dioxide and regenerating the reducing agent by contact with a reducing agent at elevated temperature.

5. The method of recovering sulfur which comprises treating, with sulfur dioxide, a reducing agent capable of combining with the oxygen of the sulfur dioxide to form a normally solid compound from which the added oxygen is capable of being removed by reduction to regenerate the reducing agent, maintaining the temperature of the reaction above the boiling temperature of sulfur, whereby the sulfur formed by the reduction of the sulfur dioxide is in the gaseous form, continuing the treatment of the reducing agent with sulfur dioxide until a substantial portion of the reducing agent has been oxidized, then discontinuing the treatment with sulfur dioxide, regenerating the reducing agent by contact with a reducing agent at elevated temperature, and condensing the sulfur produced.

6. The method of recovering sulfur which comprises treating oxidizable sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

7. The method of recovering sulfur which comprises treating oxidizable metal sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

8. The method of recovering sulfur which comprises treating oxidizable alkaline earth metal sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

9. The method of recovering sulfur which comprises treating oxidizable alkali metal sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

10. The method of recovering sulfur which comprises treating calcium sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

11. The method of recovering sulfur which comprises treating magnesium sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substantial portion of the sulfide has been converted to the sulfate form, then discontinuing the treatment with sulfur dioxide and reducing the sulfate to the sulfide at elevated temperature.

12. The method of recovering sulfur which comprises treating sodium sulfide with sulfur dioxide, maintaining the temperature of the reaction above the boiling temperature of sulfur, whereby the sulfur formed by the reduction of the sulfur dioxide is in a gaseous form, continuing the treatment of the sulfide with sulfur dioxide until a substanial portion of the sulfide has been converted to the sulfate form, then discontinuing the treatment with sulfur dioxide and reducing the sulfate to the sulfide at elevated temperature.

LUDWIG ROSENSTEIN.
LEONARD KLEIN.